US008433007B2

(12) United States Patent
Xiang et al.

(10) Patent No.: US 8,433,007 B2
(45) Date of Patent: Apr. 30, 2013

(54) RECEIVER AND METHOD FOR RECEIVING DIGITAL SIGNAL

(75) Inventors: Juan Xiang, Beijing (CN); Li Zou, Beijing (CN)

(73) Assignee: Thomson Licensing (FR)

( * ) Notice: Subject to any disclaimer, the term of this patent is extended or adjusted under 35 U.S.C. 154(b) by 810 days.

(21) Appl. No.: 12/456,981

(22) Filed: Jun. 25, 2009

(65) Prior Publication Data

US 2010/0034300 A1    Feb. 11, 2010

(30) Foreign Application Priority Data

Jun. 30, 2008    (EP) .................................... 08290630

(51) Int. Cl.
*H03D 1/00*    (2006.01)
*H04L 27/06*    (2006.01)

(52) U.S. Cl.
USPC ............................ 375/343; 375/346; 375/350

(58) Field of Classification Search .................. 375/343, 375/348, 358, 316
See application file for complete search history.

(56) References Cited

U.S. PATENT DOCUMENTS 7,961,816 B2 *  6/2011  Sheu ............................. 375/316
2010/0091916 A1 *  4/2010  Henriksson et al. .......... 375/343

OTHER PUBLICATIONS

Bhargava Y et al.: "Efficient Frequency Offset Estimation and Tracking for Reuse-1 OFDMA Systems", IEEE Region 10 Conference 2006—TENCON 2006, Nov. 1, 2006 pp. 1-4.*

In-Hang Chung et al. Use of Diverse Delayed Correlation for an ML Carrier Frequency Offset Estimator in OFDM-Based IEEE 802.1 la WLAN's I EEE International Conference on Communications, 2005, vol. 4, May 16, 2005, May 20, 2005 pp. 2548-2552.*

Bhargava Y et al.: "Efficient Frequency Offset Estimation and Tracking for Reuse-1 OFDMA Systems" IEEE Region 10 Conference 2006—TENCON 2006, Nov. 1, 2006 pp. 1-4, XPO31069077, NY USA ISBN: 978-1-4244-0548-0.

In-Hang Chung et al. Use of Diverse Delayed Correlation for an ML Carrier Frequency Offset Estimator in OFDM-Based IEEE 802.11a WLAN's IEEE International Conference on Communications, 2005, vol. 4, May 16, 2005, May 20, 2005 pp. 2548-2552, XP010825647 NJ, USA ISBN: 978-0-7803-8938-0 *abstract* Sections I-IV *figures 1,2*.

Mizoguhci M et al: "A fast burst synchronization scheme for OFDM" IEEE International Conference on Universal Personal Communications, vol. 1, Jan. 1, 1998, pp. 125-129 ,XP002121851 NY, USA *abstract* Sections i-V *figures 2,5, 8*.

Keller T et al: Orthogonal frequency division mutliplex synchronisation techniques for wireless local area networks IEEE Seventh International Symposium on Personal, Indoor and Mobile Radio Communications, 1996—PIMRC '96 vol. 3, Oct. 15, 1996-Oct. 18, 1996 pp. 963-967 XP010209106 NY, USA ISBN: 978-0-7803-3692-6 *abstract* Sections 1-6 *figures 2,4*.

(Continued)

*Primary Examiner* — Daniel Washburn
*Assistant Examiner* — Qutbuddin Ghulamali
(74) *Attorney, Agent, or Firm* — Jack Schwartz & Associates, PLLC (57) ABSTRACT

The present invention provides a receiver for receiving digital signals including frames with a binary modulated cyclic preamble, comprising: means for correlating at least part of a first cyclic preamble in a first frame and at least part of a second cyclic preamble in a second frame, and for determining a carrier frequency offset based on said correlation.

6 Claims, 5 Drawing Sheets

OTHER PUBLICATIONS

Ci-Yeh Yu et al.: "Design and simulation of a MIMO ODM baseband transceiver for high throughput wireless LAN" IEEE Asia-Pacific Conference on Circuits and Systems, 2004—Proceedings, vol. 1, Dec. 6, 2004, Dec. 9, 2004 pp. 205-208, XP010783080 NJ, USA ISBN: 978-0-7803-8660-0 *abstract* Sections 2 and 3.

European Search Report dated Mar. 16, 2009.

* cited by examiner

Fig. 1

PRIOR ART

RECEIVER AND METHOD FOR RECEIVING DIGITAL SIGNAL

This application claims the benefit, under 35 U.S.C. §119 of European Patent Application 08290630.6, filed Jun. 30, 2008.

FIELD OF THE INVENTION

The present invention relates in general to a receiver and method for receiving digital signal, and more particularly, to a receiver and method for recovering carrier frequency in the digital communication system.

BACKGROUND OF THE INVENTION

In a synchronous digital communication or broadcasting system, owing to the influence of Doppler Frequency offset and the local carrier error, the frequency of the received signal will be shifted. The frequency offset will cause an additional phase rotation of the received signal which will seriously deteriorate the performance of the receiver.

Especially in multi-carrier modulation technology as used in an Orthogonal Frequency Division Multiplexing (OFDM) transmission system which splits a high-rate data-stream into a number of lower rate streams to be transmitted simultaneously over a number of sub-carriers, a carrier frequency offset will introduce Inter-Carrier Interference (ICI) reducing the orthogonality of the sub-carriers. Therefore, the OFDM systems are very sensitive to Carrier frequency offset. The problem is important for the consumer perceived quality in a consumer-oriented receiver based on OFDM technology.

As for frequency offset estimation in a traditional OFDM system based on Digital Terrestrial Media Broadcasting Standards, it will usually include two parts: an integer frequency offset (IFO, multiple of subcarrier interval) and a fraction frequency offset (FFO, less than half of subcarrier interval). The IFO can be determined through cross correlation using pilots in the frequency domain, while the FFO can be determined through auto correlation using cyclic prefixes in time domain.

SUMMARY OF THE INVENTION

According to one aspect of the invention, provide a receiver for receiving digital signals including frames with a binary modulated cyclic preamble, comprising: means for correlating at least part of a first cyclic preamble in a first frame and at least part of a second cyclic preamble in a second frame, and for determining a carrier frequency offset based on said correlation.

The invention also concerns a method for receiving digital signals including frames with a binary modulated cyclic preamble, comprising: correlating at least part of a first cyclic preamble in a first frame and at least part of a second cyclic preamble in a second frame, and determining a carrier frequency offset based on said correlation.

DETAIL DESCRIPTION OF PREFERRED EMBODIMENTS

A description will now be given with reference to the attached figures to illustrate advantages and features of the present invention, according to various illustrative embodiments of the present invention.

Figure 1:
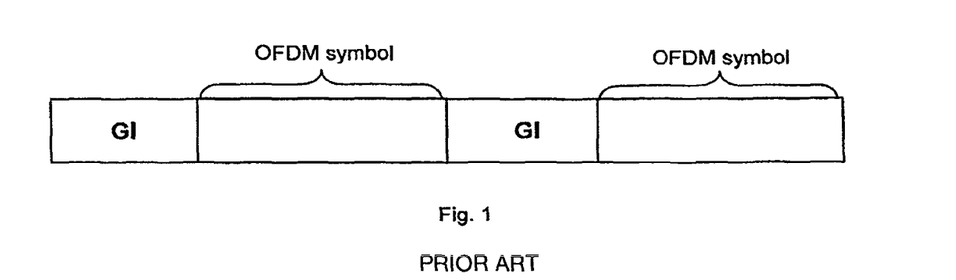
FIG. 1 is a diagram showing an exemplary prior art frame structure of an OFDM symbol according to a first embodiment of the invention.

FIG. 1 is a diagram showing an exemplary prior art frame structure of an OFDM symbol according to a first embodiment of the invention. As shown in FIG. 1, the OFDM frame structure includes an OFDM symbol area which is the effective symbol of the data to be transmitted and a Guard Interval (GI) area inserted before the OFDM symbol. The inserted GI can help suppress the Inter-Symbol Interference (ISI) which is generated by superposed multipath reflections. More specifically, the guard interval is chosen to be longer than the expected multipath delay, so the multipath components from one symbol will not interfere with the next symbol. The GI can also be used to recover the carrier frequency in the OFDM receiver.

In certain applications, such as DVB-T, the GI comprises a Cyclic Prefix (CP) which is the same OFDM data as the last part of the corresponding OFDM symbol. According to the present embodiment of the invention, the CP is replaced with a Pseudo Noise (PN) sequence which has a spectrum similar to a random sequence of bits but is deterministically generated. For example, during the transmission in channels, the PN sequence is converted into non-zero binary symbol through the mapping of a 0 bit value to a +1 value and of a 1 bit value to a −1 value. Besides of the ON sequence, other binary modulated cyclic preamble can also be used for each frame.

Figure 2:
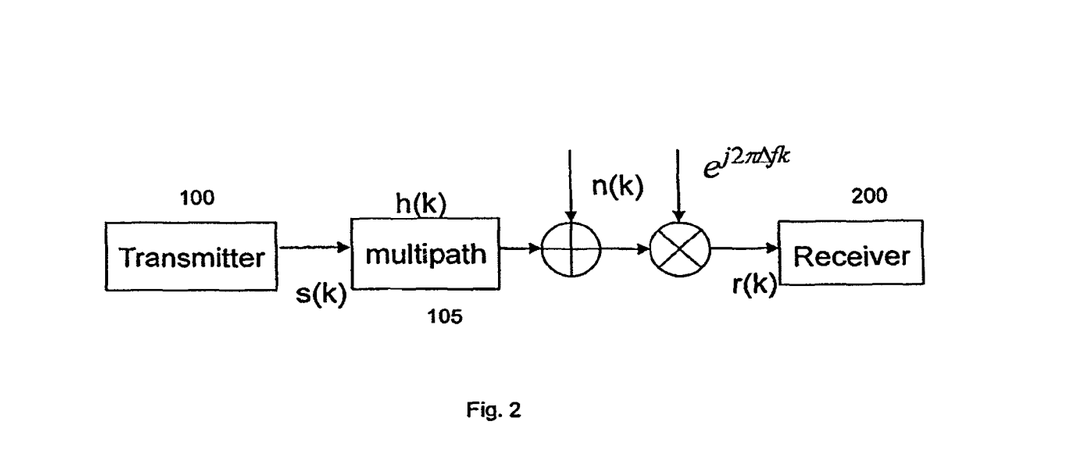
FIG. 2 is a schematic diagram showing Frequency Offset Modeling in a communication system according to the first embodiment of the invention.

FIG. 2 is a schematic diagram showing Frequency Offset Modeling in a communication system according to the embodiment of the invention. In FIG. 2, the transmitter 100 sends OFDM signal s(k) to receiver 200 through multipath 105 transmission, and then signal r(k) will be received at the receiver 200 after various noises in the channels are added to the signal. The signal transmission can be expressed as the following equation 1:

$$r(k)=(s(k)*h+n(k))e^{j2\pi\Delta fk}=s(k)e^{j2\pi\Delta fk}+n'(k) \qquad (E\ 1)$$

The symbol '*' represents a convolution, h is the multipath influence on the symbol, n(k) and n'(k) represent Gaussian noise. In addition, a Carrier frequency offset $^\Delta f$ will be caused during the transmission. To simplify and without loss of generality, we suppose h=1 which means channel is only an Additive White Gaussian Noise (AWGN) channel.

Figure 3:
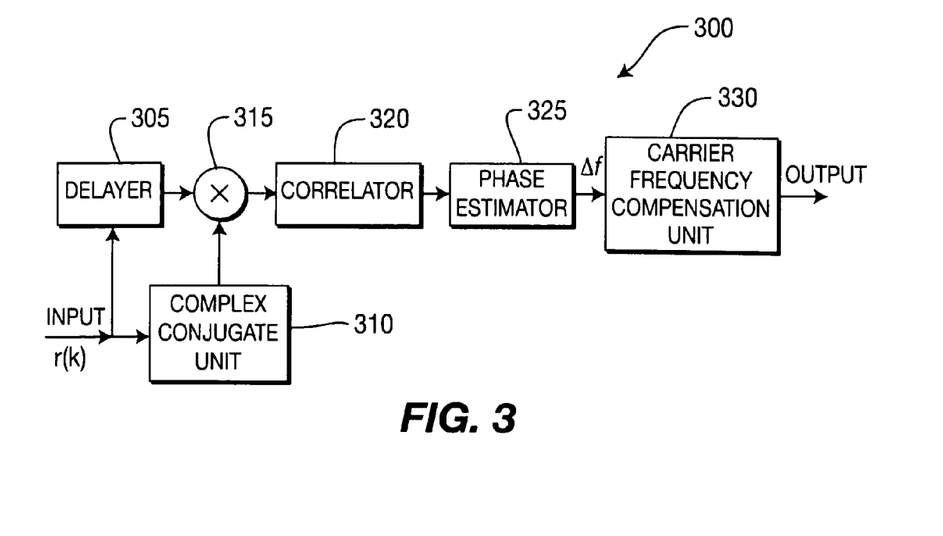
FIG. 3 is a block diagram of carrier frequency recovery means in OFDM receiver as shown in FIG. 2 according to the first embodiment of the invention.

FIG. 3 is a block diagram of a carrier frequency recovery module 300 in an OFDM receiver 200 as shown in FIG. 2 according to the embodiment of the invention. The carrier frequency recovery means 300 includes a delayer 305, a complex conjugate unit 310, a multiplier 315, a correlator 320, a phase estimator 325 and a carrier frequency compensation unit 330.

The received signal r(k) in the receiver 200 is input to the carrier frequency recovery means 300. Here, the carrier frequency recovery means 300 uses at least part of a PN guard interval, that is signal r(k), and at least part of another PN guard interval, that is signal r(k+L), to recover the carrier frequency. Here, the two parts are selected from different guard interval of two frames, and may have different start point relative to respective frame, that is, r(k) can be started from the $m^{th}$ data of the guard interval, and r(k+L) can started from the $n^{th}$ data of the other guard interval. The delayer 305 may delay the input by a predetermined delay interval L to get the signal r(k+L). The determination of the delay interval L will be described in detail later.

The complex conjugate unit 310 is adapted to provide a conjugate complex r*(k) of the received signal r(k). Then the multiplier 315 multiplies the delayed r(k), that is r(k+L), with the conjugate complex r*(k) of signal r(k). The correlator 320 is adapted to provide a correlation value of N samples with the above predetermined delay interval L. Then the phase estimator 325 can obtain a Carrier frequency offset $^\Delta$f according to the correlation value output from the correlator 320. In order to recover the carrier frequency, the carrier frequency compensation unit 330 compensates the offset $^\Delta$f to the carrier, that is, a $-^\Delta$f will be multiplied with the carrier signal to recover the carrier frequency. The process will be described in detail according to the frame structure as shown in FIG. 4.

Figure 4:
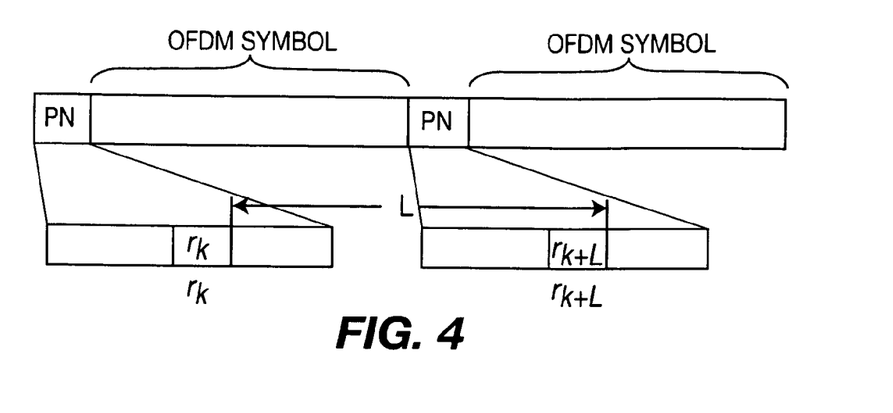
FIG. 4 is a diagram comprising an exemplary frame structure of an OFDM symbol and used to explain part of the process according to the first embodiment of the invention.

FIG. 4 is an exemplary frame structure of an OFDM symbol which will be used to explain the correlation process according to the embodiment of the invention. In the embodiment, two PN sequences in two adjacent OFDM frames are used to determine the phase offset, so the predetermined guard interval L may be the length of a frame, that is, the length of the PN sequence added to the length of the OFDM symbol. According to the embodiment, the received signal r(k) with carrier frequency offset in the first PN sequence can be expressed as:

$$r(k)=s(k)\exp(j2\pi\Delta fk) \quad (E\,2)$$

The received signal r(k+L) with carrier frequency offset in the second PN sequence can be expressed as:

$$r(k+L)=s(k+L)\exp(j2\pi\Delta f(k+L)) \quad (E\,3)$$

The signal r(k+L) is stored in the delayer 305 which delays the signal in the second PN sequence. Then in the multiplier 315, the signal r(k+L) is multiplied by the conjugate complex of signal r(k) obtained from the complex conjugate unit 310, and the result is output to the correlator 320. The calculation in the multiplier 315 can be expressed as:

$$r(k+L)r^*(k)=s(k+L)s^*(k)\exp(j2\pi\Delta fL) \quad (E\,4)$$

Then, the correlator 320 calculates the correlation of the first PN sequence of the first frame with the second PN sequence of the second frame as follows:

$$\sum_{k=1}^{N}[r(k+L)r^*(k)]^2 = \exp(j4\pi\Delta fL)\sum_{k=1}^{N}[s(k+L)s^*(k)]^2 = \quad (E5)$$

$$\exp(j4\pi\Delta fL)\sum_{k=1}^{N}A(k) = \exp(j4\pi\Delta fL)A$$

N is the sample number in the PN sequence, and A(k) is a number with positive real value which can be expressed as A. Here a square of the signal is used to eliminate the influence of the PN symbol on the phase. Please note that the two parts of PN guard interval here can be any part in the guard interval. Preferably, the same part in two guard intervals shall be selected to eliminate the influence of the multipath transmission.

From the above equation E5, the phase estimator 325 obtains the carrier frequency offset Δf which needs to be removed from a carrier to recover the carrier frequency.

Although the above embodiment uses two PN sequences in adjacent frames to obtain the phase offset, any pair of PN sequences in two different frames can be used. That is, the delay interval L can be the length of two frames or more, and such correlation is called inter-frame correlation.

Figure 5:
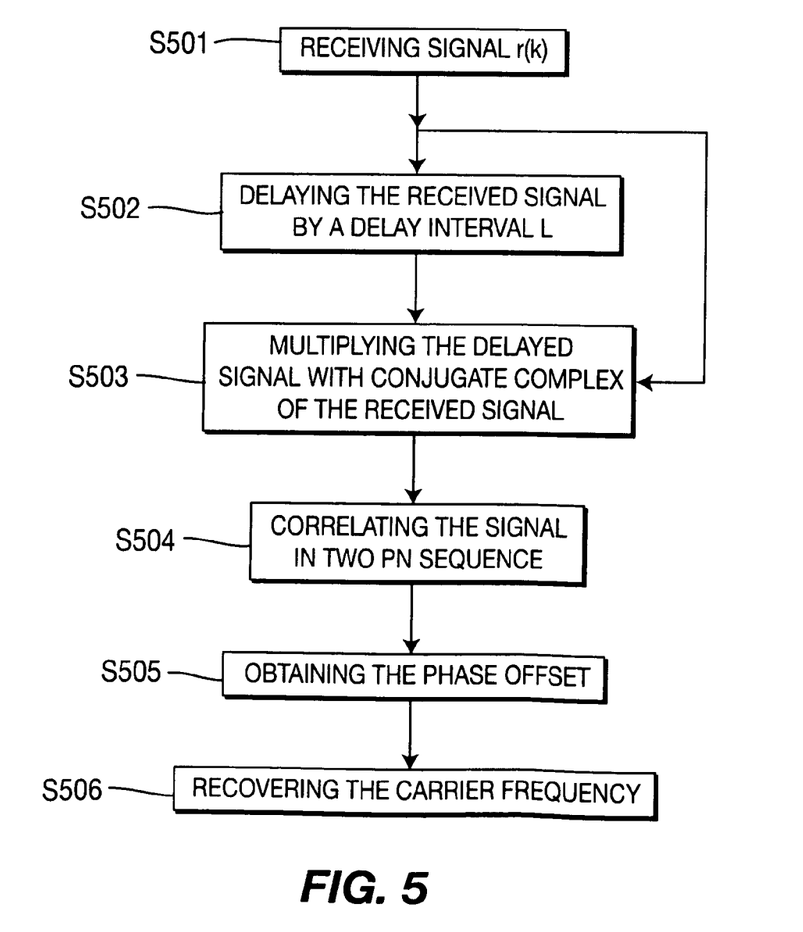
FIG. 5 is a flow chart showing the procedure of carrier frequency recovery in accordance with the first embodiment of the present invention.

FIG. 5 is a flow chart showing the procedure of carrier frequency recovery in accordance with the embodiment shown in FIG. 4. At step S501, signal r(k) in the first PN sequence in a frame is received by the receiver 200, and then the received signal is delayed by a delay interval L at step S502. At step 503, the delayed signal r(k+L) is multiplied with conjugate complex of the received signal r(K) in the second PN sequence in another frame. At step 504, r(k) and r(K+L) in the two sequences are correlated, and at step 505 a phase offset is obtained from the correlation result. At the end, a carrier frequency can be recovered by removing the frequency offset from the received signal at step 506.

Figure 6:
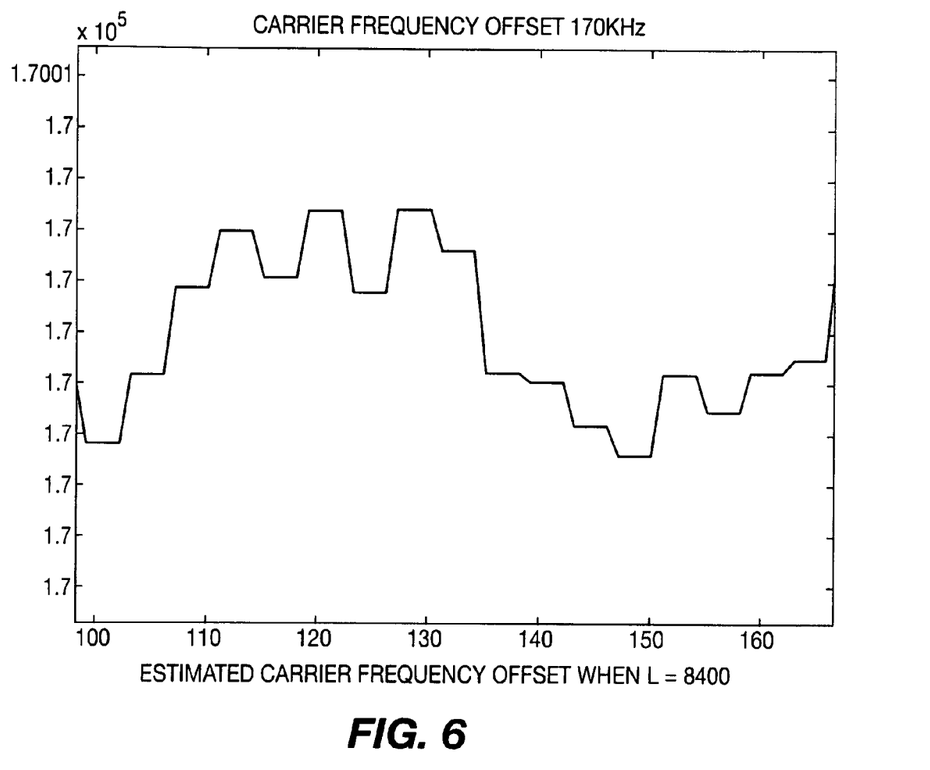
FIG. 6 is a diagram showing an estimated carrier frequency offset in a simulation environment according to the embodiment in FIG. 5.

FIG. 6 is a diagram showing an estimated carrier frequency offset in a simulation environment according to the embodiment in FIG. 5. This simulation environment is a Digital Terrestrial Media Broadcasting (DTMB) system which uses OFDM as a core technology. The Guard Interval includes 420 samples of a PN sequence, that is, the sample number N in the above equations is 420. The frame interval which is the length of the frame including the length of PN sequence and the OFDM symbol is 4200 samples. The FFT size is 3780 and the sampling frequency is 7.56 MHz.

In this simulation, the delay interval corresponds to the duration of 8400 samples. It means two PN sequences two frames apart are used. A noise which can cause a Carrier Frequency Offset 170 KHz is input to the transmitted signal to simulate the channel environment. The estimated carrier frequency offset can be seen from the FIG. 6. It shows that according to the present embodiment of the invention, the precision of the estimation is very high, so that the estimation offset is very small, and even can be omitted. Since the estimation offset is very small, only a single carrier frequency value $1.7*10^5$ KHz can be seen in the FIG. 6 according to the resolution of the simulation, so the range of the estimation offset is less than 0.0001 KHz.

Actually the precision of the estimation is raised with the increase of the delay interval L. However, the delay length will cause a long calculation delay and a long carrier recovery delay. Therefore, the delay interval L can be selected by one skilled in the art according to the requirements of the communication system.

Figure 7:
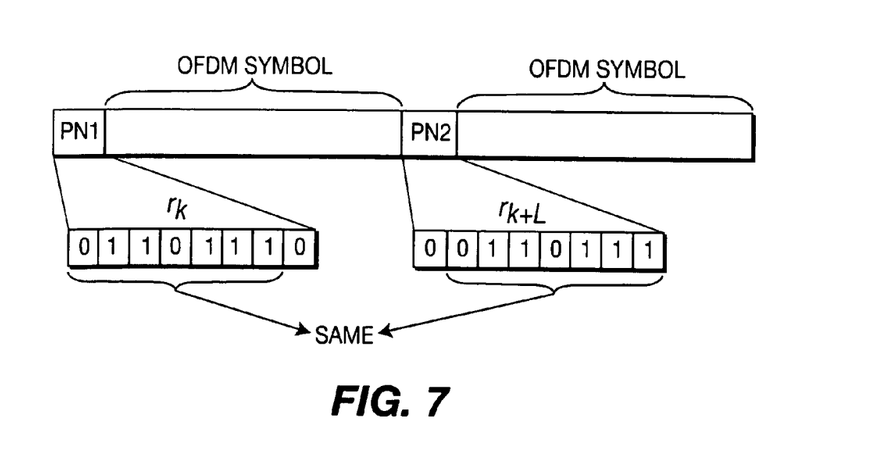
FIG. 7 is an exemplary frame structure of an OFDM symbol according to a second embodiment of the invention.

In the above embodiment, identical PN sequences are present in each guard interval of each OFDM frame. In practice, phase rotated PN guard intervals can be used. Phase rotating a PN sequence consists in shifting the sequence bit-wise before modulating it onto its carriers. A bit shifted out of a sequence is reinserted at the beginning of the sequence to maintain the pseudo-random nature of the sequence. This is shown in FIG. 7. FIG. 7 is an exemplary frame structure of an OFDM symbol according to a second embodiment of the invention, wherein the pseudo noise sequence PN1 of a first OFDM symbol is "01101110" while the pseudo noise sequence PN2 of a second OFDM symbol is "00110111", i.e. shifted by one bit compared to the previous sequence. If the carrier frequency estimation of the above embodiments uses signal intervals at the same location of two guard intervals (i.e. r(k) and r(k+L))) while the content of these intervals is not the same, the estimation precision will be impaired in a multipath channel environment.

Figure 8:
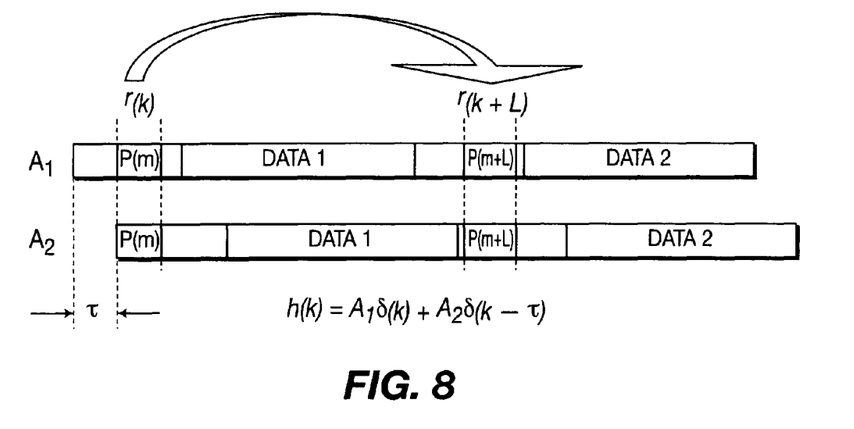
FIG. 8 is an exemplary frame structure for explaining the phase rotation delay correction according to the embodiment in FIG. 8.

FIG. 8 is an exemplary frame structure for explaining the influence of a multipath channel on the carrier frequency estimation according to the second embodiment. In FIG. 8, a two signal path channel is used as an example which shows a baseband equivalent channel used for emulation and is composed of two signal paths with complex amplitude A1 and A2.

In the first OFDM symbol, suppose $$s(k)=p(m), s(k-\tau)=p(n),$$

and in the second OFDM symbol, $$s(k+L)=p(m+L), s(k+L-\tau)=p(n+L).$$

Then the received signal r(k) and r(k+L) will be:

$$r(k)=[A_1 p(m)+A_2 p(n)]e^{j2\pi\Delta fk} \quad (E6)$$

and $$r(k+L)=[A_1 p(m+L)+A_2 p(n+L)]e^{j2\pi\Delta f(k+L)} \quad (E7)$$

Suppose $$s(k)=p(m), s(k-\tau)=p(n)$$

Due to the PN code being binary modulated, p(x)=1 or (−1). If there is a phase rotation in the two PN guard intervals, then $$p(m)p(n)=-p(m+L)p(n+L)$$

Using the correlation calculation in E5, $$[r^*(k)r(k+L)]^2 = [a+2|A_1|^2|A_2|^2\left(\frac{A_1}{A_2}+\frac{A_2}{A_1}\right)p(m)p(n)+ \quad (E8)$$

$$2|A_1|^2|A_2|^2\left(\frac{A_1}{A_2}+\frac{A_2}{A_1}\right)^* p(m+$$

$$l)p(n+l)]e^{j2(2\pi\Delta fLTs)}$$

$$= \left\{a \pm 2|A_1|^2|A_2|^2\left[\left(\frac{A_1}{A_2}+\frac{A_2}{A_1}\right)-\right.\right.$$

$$\left.\left.\left(\frac{A_1}{A_2}+\frac{A_2}{A_1}\right)^*\right]\right\}e^{j2(2\pi\Delta fLTs)}$$

$$= \left\{a \pm 4j|A_1|^2|A_2|^2 \mathrm{Im}\left(\frac{A_1}{A_2}+\frac{A_2}{A_1}\right)\right\}e^{j2(2\pi\Delta fLTs)}$$

$$= \{a \pm bj\}e^{j2(2\pi\Delta fLTs)} = A' e^{j[2(2\pi\Delta fLTs)+\phi]}$$

From the above, when there is a phase rotation in the two PN guard intervals, since the above equation includes a complex part $$\left(\frac{A_1}{A_2}+\frac{A_2}{A_1}\right)-\left(\frac{A_1}{A_2}+\frac{A_2}{A_1}\right)^*,$$

the estimated frequency offset will have the following additional offset caused by the multipath channel:

$$\frac{\phi}{2(2\pi LTs)}$$

In the second embodiment, the PN codes in each frame guard interval will vary and be slightly shifted from one to the next. This characteristic can be used to perform a Phase Rotated Delay Correlation. More particularly, the samples of a PN guard interval used to calculate the carrier frequency shall guarantee $$p(m)p(n)=p(m+L)p(n+L) \quad (E9)$$

If the above E9 is met, the start point of the estimation, that is the same signals in two PN guard interval have been found, so phase rotation can be corrected, and the complex part in E8 will be eliminated. In a system with a phase rotated PN guard interval, using the above equation 9, the same signals can be obtained before the carrier frequency offset estimation, so that the resolution of carrier frequency estimation can be improved.

Figure 9:
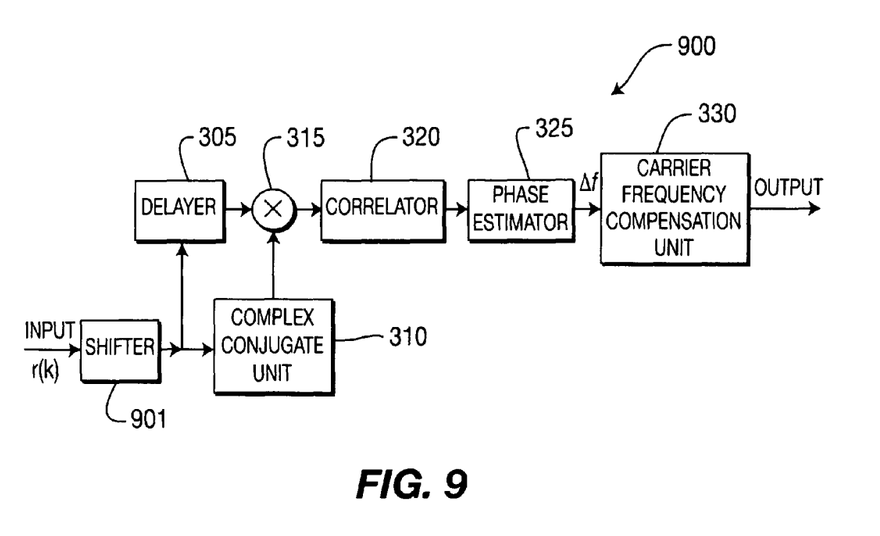
FIG. 9 is a block diagram of carrier frequency recovery means in OFDM receiver according to the second embodiment of the invention.

FIG. 9 is a block diagram of carrier frequency recovery means 900 in OFDM receiver according to the second embodiment of the invention. In FIG. 9, a shifter 901 is added to complete the shifting of the PN guard interval to get the same signal. The shifting can be applied to one of the two PN guard intervals, or both of them. Please note that the calculation of equation 9 is performed before the shifting, and is not shown in FIG. 9. After the process of shifter 901, the process and modules of the carrier frequency recovery means 900 will be the same as that in FIG. 3.

Although the embodiments of the invention are described based on an OFDM system including a OFDM symbol with PN code guard interval, the man skilled in the art may adapt the invention to other environments using any binary modulated cyclic preamble. Such cyclic preamble is often combined with effective data area of each frame to aid the frequency recovery and phase synchronous, and located in each digital signal frame periodically in order, such as the repetition of the same PN code.

While FIGS. 3 and 9 represent a possible block diagram for implementing the described embodiment, other implementations may be made. In particular, the different items of FIGS. 3 and 9 may be implemented in hardware or software, or a combination of hardware and software, and the different functional blocks of FIGS. 3 and 9 may be combined or split as required by a specific application.

The foregoing merely illustrates the embodiments of the invention and it will thus be appreciated that those skilled in the art will be able to devise numerous alternative arrangements which, although not explicitly described herein, embody the principles of the invention and are within its spirit and scope.

The invention claimed is:

1. A receiver for receiving digital signals including frames, wherein, each frame comprises a binary modulated cyclic preamble and the binary modulated cyclic preamble comprises a pseudo noise sequence, wherein, bits of the pseudo noise sequence in a frame is shifted from those in a previous sequence, comprising:

a shifter for shifting at least one of a first pseudo noise sequence in a first cyclic preamble of a first frame and a second pseudo noise sequence in a second cyclic preamble of a second frame if there is a phase rotation between the first pseudo noise sequence and the second pseudo noise sequence; and a correlator for correlating two resultant pseudo noise sequences from the first pseudo noise sequence and the second pseudo noise sequence after the shifting by the shifter, and for determining a carrier frequency offset based on said correlation.

2. The receiver according to claim 1, further comprising a carrier frequency compensation unit for compensating the carrier frequency offset for the received digital signals.

3. The receiver according to claim 1, wherein the first cyclic preamble and the second cyclic preamble are from two successive frames respectively.

4. A method for receiving digital signals including frames, wherein, each frame comprises a binary modulated cyclic preamble and the binary modulated cyclic preamble comprises a pseudo noise sequence, wherein, bits of the pseudo noise sequence in a frame is shifted from those in a previous sequence, comprising:

shifting at least one of a first pseudo noise sequence in a first cyclic preamble of a first frame and a second pseudo noise sequence in a second cyclic preamble of a second frame if there is a phase rotation between the first pseudo noise sequence and the second pseudo noise sequence;

correlating two resultant pseudo noise sequences from the first pseudo noise sequence and the second pseudo noise sequence after the shifting operation, and determining a carrier frequency offset based on the correlating.

5. The method according to claim 4, further comprising compensating the carrier frequency offset for the received digital signals.

6. The method according to claim 4, wherein the first cyclic preamble and the second cyclic preamble are from two successive frames respectively.

* * * * *